(12) United States Patent
Iwasaki (10) Patent No.: US 12,056,409 B2
(45) Date of Patent: Aug. 6, 2024

(54) SERVER, CONTROL METHOD THEREFOR, AND NON-TRANSITORY STORAGE MEDIUM

(71) Applicant: CANON KABUSHIKI KAISHA, Tokyo (JP)

(72) Inventor: Yukiyasu Iwasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/103,586

(22) Filed: Jan. 31, 2023

(65) Prior Publication Data

US 2023/0273757 A1 Aug. 31, 2023

(30) Foreign Application Priority Data

Feb. 25, 2022 (JP) .................................. 2022-028380

(51) Int. Cl.
G06F 3/12 (2006.01)

(52) U.S. Cl.
CPC .......... *G06F 3/1263* (2013.01); *G06F 3/1215* (2013.01); *G06F 3/1238* (2013.01); *G06F 3/1273* (2013.01); *G06F 3/1204* (2013.01)

(58) Field of Classification Search
None
See application file for complete search history.

(56) References Cited

U.S. PATENT DOCUMENTS

| 2010/0110465 | A1* | 5/2010 | Ferlitsch | G06F 3/1285 |
| | | | | 358/1.15 |
| 2019/0079704 | A1* | 3/2019 | Tokuchi | G06F 3/1204 |
| 2019/0079709 | A1* | 3/2019 | Tokuchi | H04L 41/22 |
| 2022/0229609 | A1 | 7/2022 | Iwasaki | |
| 2022/0276810 | A1 | 9/2022 | Iwasaki | |

FOREIGN PATENT DOCUMENTS

JP 4472944 B2 6/2010

\* cited by examiner

*Primary Examiner* — Darryl V Dottin
(74) *Attorney, Agent, or Firm* — VENABLE LLP (57) ABSTRACT

A server for receiving a print job from a print service that has received the print job from an information processing apparatus accesses the print service, manages a condition concerning access to the print service, manages a status of past access to the print service, and determines, based on the status of past access, whether the condition is not to be satisfied by newly accessing the print service. In a case where it is determined the condition is not to be satisfied, new access to the print service is ceased, and in a case where the print service is not accessed since the condition is not to be satisfied, after a wait time for an individual processing elapses, access the print service with respect to the individual processing is retried.

12 Claims, 9 Drawing Sheets

SERVER, CONTROL METHOD THEREFOR, AND NON-TRANSITORY STORAGE MEDIUM

BACKGROUND OF THE INVENTION

Field of the Invention

The present invention relates to a server, a control method therefor, and a non-transitory storage medium.

Description of the Related Art

There is known a technique in which an information processing apparatus requests printing to a print service formed on a cloud and a printing apparatus associated with the print service executes printing. To make it possible to execute printing even if a print service usable from an information processing apparatus does not support a desired printing apparatus, a mediation service between the print service and the printing apparatus has also been considered. Japanese Patent No. 4472944 describes a technique of adjusting a load on a web server by requests by adding pseudo requests to requests transmitted to the web server. As the scale of a system that uses a print service is larger, the number of times of access to the print service per unit time increases. This increases a load on the print service. In addition, if the number of times of access to the print service per unit time increases, access may be regarded as unauthorized access such as Denial of Service (DoS) attack, thereby interrupting access to the print service.

SUMMARY OF THE INVENTION

Some aspects of the present invention provide a technique for appropriately accessing a print service. According to an embodiment, a server for receiving a print job from a print service that has received the print job from an information processing apparatus is provided. The server includes an access unit configured to access the print service, a condition management unit configured to manage a condition concerning access to the print service, an access management unit configured to manage a status of past access to the print service, and a determination unit configured to determine, based on the status of past access, whether the condition is not to be satisfied by newly accessing the print service. In a case where it is determined that the condition is not to be satisfied, the access unit does not newly access the print service.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 1:
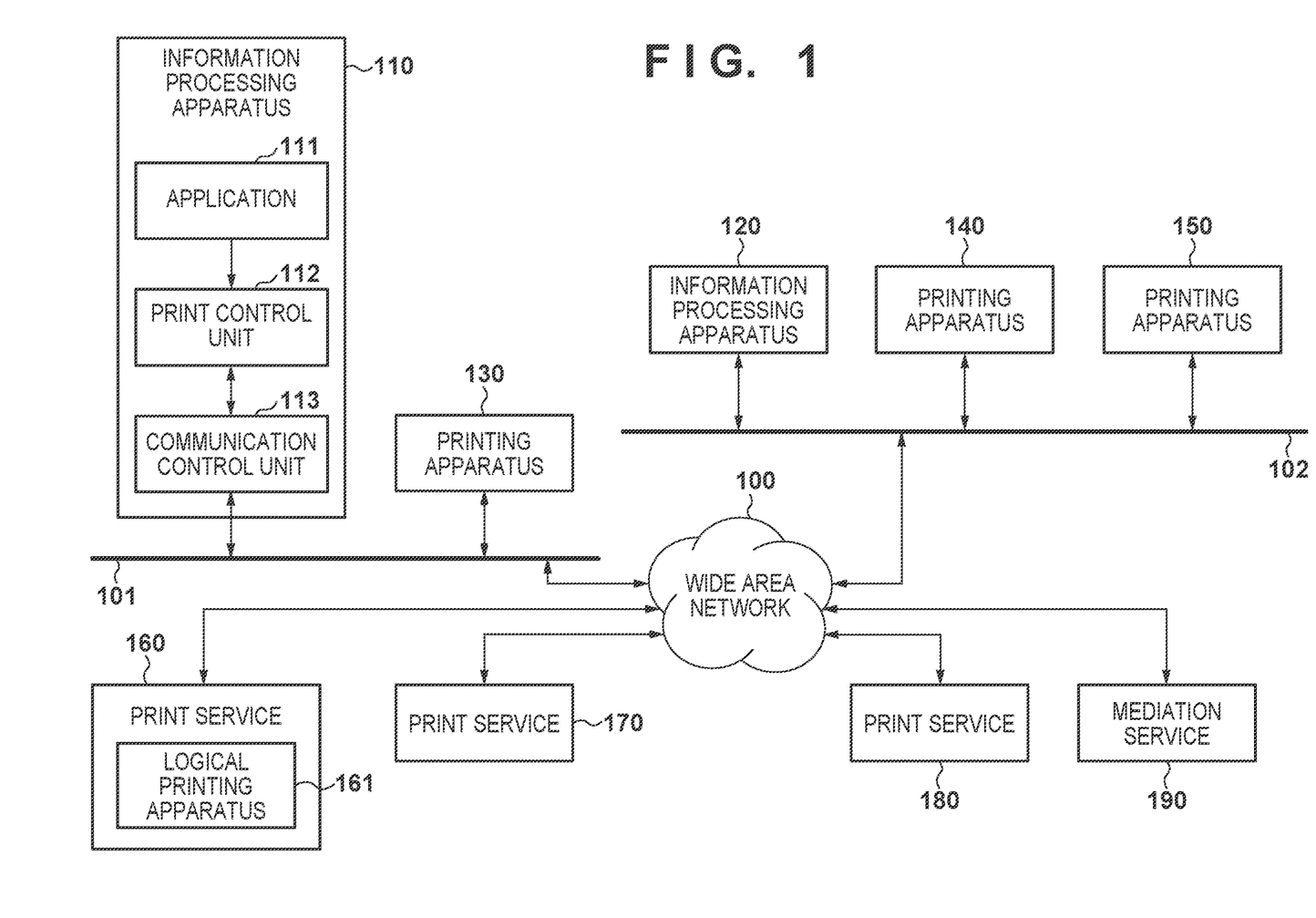
FIG. 1 is a block diagram for explaining an example of the configuration of a printing system according to a first embodiment.

An example of the configuration of a printing system according to a first embodiment will be described with reference to FIG. 1. The printing system includes, for example, information processing apparatuses 110 and 120, printing apparatuses 130, 140, and 150, print services 160, 170, and 180, and a mediation service 190. The numbers of components of the printing system are not limited to them in the example of FIG. 1. The printing system may include components not shown in FIG. 1.

The information processing apparatus 110 and the printing apparatus 130 are connected to a local area network (LAN) 101, and are connected to a wide area network 100 (for example, the Internet) via the LAN 101. The information processing apparatus 120 and the printing apparatuses 140 and 150 are connected to a LAN 102, and are connected to the wide area network 100 via the LAN 102. The LANs 101 and 102 may be wired LANs, wireless LANs, or a combination thereof. The print services 160, 170, and 180 and the mediation service 190 are also connected to the wide area network 100. The respective components of the printing system may be communicable with each other via the wide area network 100.

The information processing apparatus 110 includes an application 111, a print control unit 112, and a communication control unit 113. The information processing apparatus 120 may have the same arrangement as that of the information processing apparatus 110 and a repetitive description thereof will be omitted. The application 111 provides a print function to the user of the information processing apparatus 110. In accordance with an input from the user, the application 111 instructs the print control unit 112 to execute printing. The print control unit 112 is a function commonly provided to a plurality of applications by the operating system (OS) of the information processing apparatus 110. The print control unit 112 transmits a print job to the LAN 101 via the communication control unit 113. The final transmission destination of the print job is a printing apparatus designated by the application 111. The application 111 may designate, as the output destination, the printing apparatus 130 connected to the same LAN 101, or designate, as the output destination, the printing apparatus 140 or 150 connected via the wide area network 100. The print job may be transmitted directly to the instructed printing apparatus or may be transmitted to the print service, as will be described later.

Each of the printing apparatuses 130, 140, and 150 executes printing in response to a print instruction. The printing apparatuses 130, 140, and 150 may be of the same model or different models. The printing apparatus 130 may include at least one of a scanner function and a FAX function in addition to the print function. The printing apparatus 130 having the plurality of functions can also be called a multifunction printer (MFP).

Each of the print services 160, 170, and 180 transmits a print instruction to the printing apparatus (for example, the printing apparatus 130) in accordance with the print job generated by the information processing apparatus 110. Although the print service 160 will representatively be explained below, the print services 170 and 180 may also have the same arrangement unless otherwise specified. As described above, the print service 160 provides the print service to the information processing apparatus. For example, the user of the information processing apparatus 120 may be able to use the print service (for example, the print service 160) for which a company the user belongs to has a contract. The print service 160 provides a virtual logical printing apparatus 161. The logical printing apparatus 161 is recognized as a printing apparatus by the information processing apparatus (more specifically, the print control unit 112). Similar to the normal printing apparatus, the information processing apparatus can generate a print queue with respect to the logical printing apparatus 161.

The user who has logged in to the print service 160 from the information processing apparatus 120 may instruct the logical printing apparatus 161 of the print service 160 to transmit a printed product in order to output the printed product from the printing apparatus 140. In response to this, the information processing apparatus 120 transmits, as a print job, an instruction for controlling the logical printing apparatus 161, print data, a setting command, and the like. The print service 160 instructs the printing apparatus 140 to execute printing in accordance with the print job received from the information processing apparatus 120.

The print service 160 may be provided by an on-premise server connected to the wide area network 100 or by a plurality of servers forming cloud computing (to be simply referred to as a cloud hereinafter). A print service provided by the cloud may be called a cloud print service. An example of the cloud print service is Universal Print® provided by Microsoft®. The print services 160, 170, and 180 may provide different print services.

Each of the print services 160, 170, and 180 can support only some printing apparatuses. If the print service supports the printing apparatus, this may mean that the printing service can transmit print data to the printing apparatus to execute printing. In the example shown in FIG. 1, assume that the print services 160 and 170 support the printing apparatuses 140 and 150 but do not support the printing apparatus 130. Assume also that the print service 180 supports the printing apparatus 130 but does not support the printing apparatuses 140 and 150. In this case, even if the print service 160 receives a print job of executing printing in the printing apparatus 130, it cannot send a print instruction to the printing apparatus 130 in response to the print job.

The mediation service 190 mediates between two print services. More specifically, the mediation service 190 receives a print job from a print service that receives the print job from the information processing apparatus, and transmits print data to another print service that can transmit the print data to the printing apparatus. In the above-described example, assume that the print service 160 receives a print job indicating the printing apparatus 130 as an output destination from the information processing apparatus 110. The print service 160 transmits the job to the mediation service 190. The mediation service 190 transmits the print job to the print service 180 that supports the printing apparatus 130, thereby executing printing in the printing apparatus 130. As described above, by using the mediation service 190, the user of the information processing apparatus 110 can execute printing in the desired printing apparatus 130 only by transmitting the print job to the print service 160 for which the user has a contract. Thus, a risk that the user of the information processing apparatus 110 carries print data outside the office and the data leaks is reduced.

The mediation service 190 may be provided by an on-premise server connected to the wide area network 100 or by the servers forming the cloud.

In the following description, a print service (for example, the print service 160) for receiving a print job from the information processing apparatus 110 and transmitting it to the mediation service 190 will be referred to as an upstream print service hereinafter. A print service (for example, the print service 180) for receiving print data from the mediation service 190 and transmitting it to the printing apparatus will be referred to as a downstream print service hereinafter. One print service may function as both an upstream print service and a downstream print service. For example, the print service 180 supports the printing apparatus 130 and does not support the printing apparatus 140. Therefore, the print service 180 may function as a downstream print service with respect to a print job for instructing printing from the printing apparatus 130, and function as an upstream print service with respect to a print job for instructing printing from the printing apparatus 140.

The plurality of servers forming the cloud are distributively arranged in a plurality of regions. The user of the information processing apparatus may select a physical region of a server that provides the print service 160 in accordance with the location of the user. Instead of this, the cloud may automatically select a server that provides a service (for example, the print service 160) in accordance with the location of the user of the information processing apparatus.

Figure 2A:
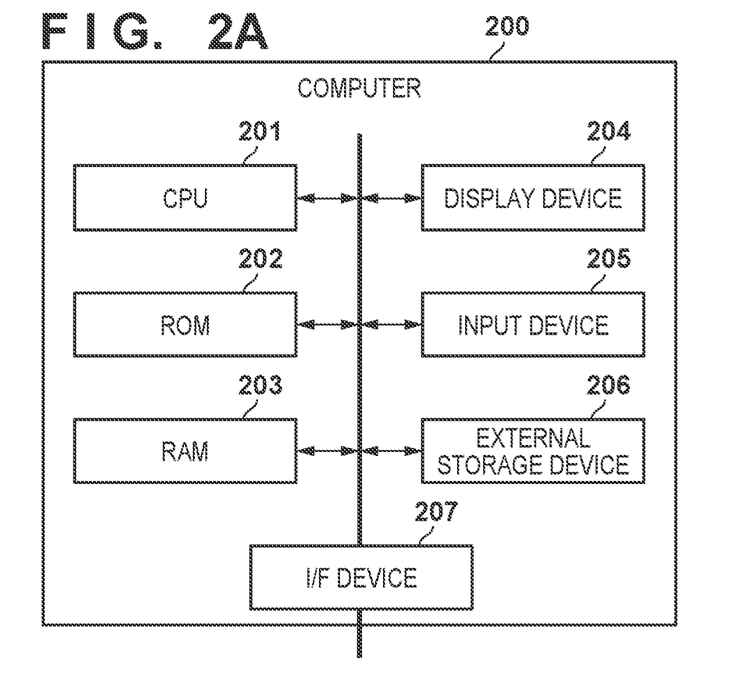
FIGS. 2A and 2B are block diagrams each for explaining an example of the hardware arrangement of an apparatus according to the first embodiment.
Figure 2B:
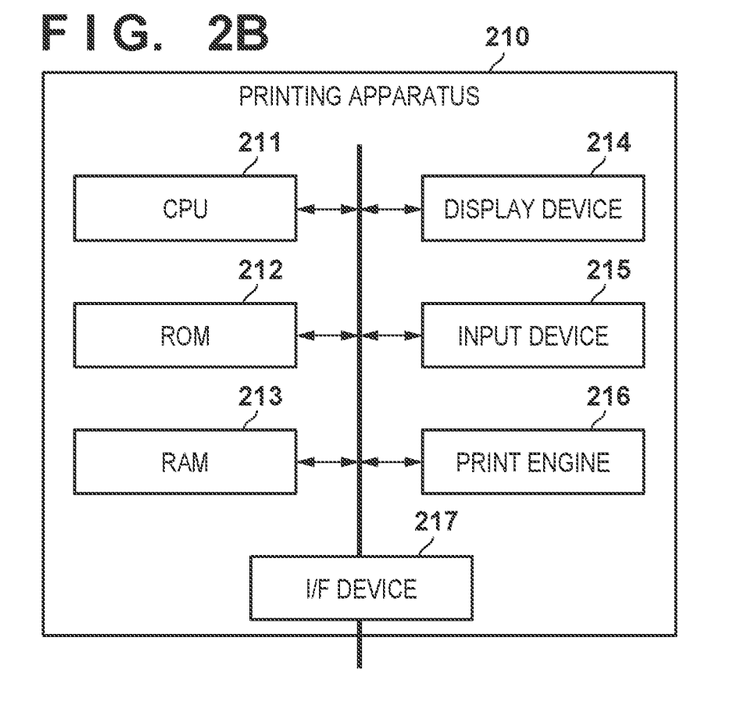

Examples of the hardware arrangements of the apparatuses used in the printing system shown in FIG. 1 will be described with reference to FIGS. 2A and 2B. An example of the arrangement of a computer 200 will be described with reference to FIG. 2A. The computer 200 may be used as the information processing apparatus 110 or 120 in FIG. 1. The computer 200 may be used to provide the print services 160, 170, and 180 and the mediation service 190. The print services 160, 170, and 180 and the mediation service 190 may be provided by different computers or the same computer. A computer that provides a service to a client may be called a service. A server that provides a print service may be called a print server. A server that provides a mediation service may be called a mediation server.

The computer 200 includes a central processing unit (CPU) 201, a read only memory (ROM) 202, a random access memory (RAM) 203, a display device 204, an input device 205, an external storage device 206, and an interface (I/F) device 207. If the computer 200 is used as the information processing apparatus 110, the computer 200 may be a desktop or notebook personal computer (PC), or a portable device such as a tablet or a smartphone.

The CPU 201 is a general-purpose processor, and controls the respective components of the computer 200. For example, the CPU 201 operates in accordance with a program stored in the ROM 202. The RAM 203 is a volatile memory, and provides a work area when the CPU 201 executes the program. The external storage device 206 is formed by, for example, a hard disk drive (HDD) or a solid-state drive (SSD), and nonvolatilely stores data. The external storage device 206 stores application software and various control programs.

The display device 204 is a device for displaying information (for example, a user interface screen, a message, or the like) to the user of the computer 200. The display device 204 is formed by a dot matrix display, an indicator, or the like. The input device 205 is a device for accepting an input from the user of the computer 200. The input device 205 is formed by, for example, a keyboard, a mouse, a touch panel, buttons, or the like. The I/F device 207 is a device for connecting the computer 200 to an external network. The I/F device 207 may be formed by a network card for wired connection, and may be formed by a baseband processor and an antenna for wireless connection.

An example of the arrangement of a printing apparatus 210 will be described with reference to FIG. 2B. The printing apparatus 210 includes a CPU 211, a ROM 212, a RAM 213, a display device 214, an input device 215, a print engine 216, and an I/F device 217. The printing apparatus 210 may be used as any one of the printing apparatuses 130, 140, and 150 shown in FIG. 1. The printing apparatus 210 is, for example, an inkjet printer. The CPU 211, ROM 212, RAM 213, display device 214, input device 215, and I/F device 217 of the printing apparatus 210 may be the same as those having the same names of the computer 200 and a repetitive description thereof will be omitted. The RAM 203 temporarily stores a program necessary for the operation of the print engine 216, setting values received from the information processing apparatus, and the like.

The print engine 216 prints on a print medium based on the print data received from the information processing apparatus. The CPU 211 receives the print data from the information processing apparatus via the I/F device 217, and transmits current status information of the printing apparatus 210 to the information processing apparatus. The status information is status data that can be returned by the printing apparatus 210 in response to a request from the information processing apparatus and represents the state of the printing apparatus 210. The status data is information for making a notification of the operation state of the printing apparatus 210 such as "printing" or "waiting state", or the error state of the printing apparatus 210 such as "out of paper", "cover open", or "out of ink".

Figure 3:
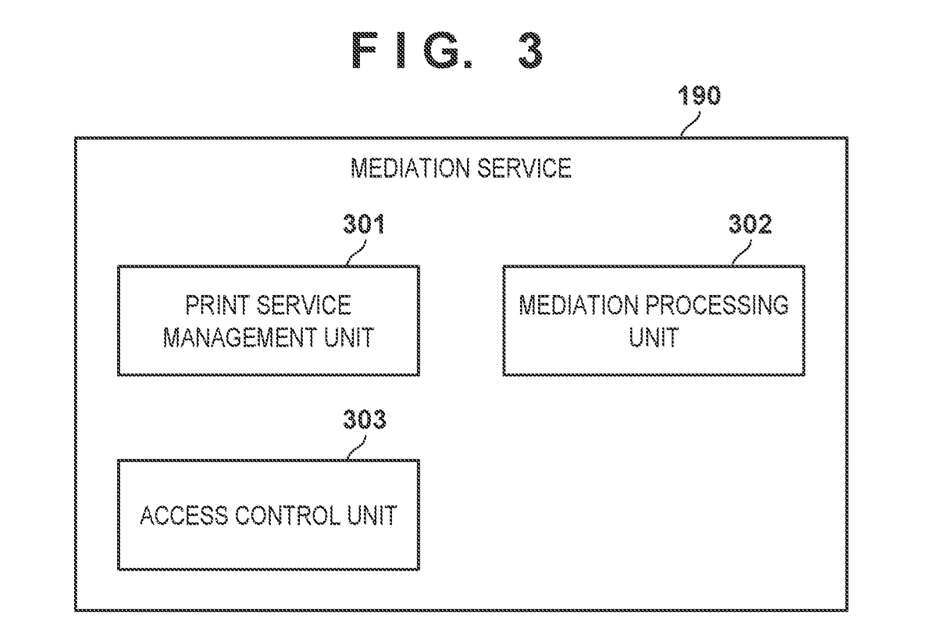
FIG. 3 is a block diagram for explaining an example of the functional arrangement of a mediation service according to the first embodiment.

Examples of the functional blocks of the mediation service 190 will be described with reference to FIG. 3. The mediation service 190 includes a print service management unit 301, a mediation processing unit 302, and an access control unit 303.

The print service management unit 301 manages information concerning a print service that uses the mediation service 190. For example, the print service management unit 301 accepts a registration instruction of a print service from the user of the mediation service 190 (for example, the manager of the print service 160), and registers the logical printing apparatus of the print service in a database in accordance with the instruction. The registered print service may be an upstream print service or a downstream print service.

The print service management unit 301 associates an upstream print service and a downstream print service with each other in accordance with an instruction from the user. To acquire information concerning the print service, the print service management unit 301 may provide a web browser operation screen to be used by the user.

The mediation processing unit 302 performs processing concerning the mediation service 190. More specifically, the mediation processing unit 302 receives a print job from an upstream print service (for example, the print service 160), converts the print job into a format that can be processed by a downstream print service (for example, the print service 180), and transmits the print job to the downstream print service. The mediation processing unit 302 may be able to execute at least one of push printing and pull printing. Push printing indicates a scheme in which when the print service 160 receives a print job from the information processing apparatus 110, the print service 160 notifies the mediation service 190 that it is necessary to mediate the print job. Upon receiving the notification, the mediation service 190 requests information concerning the print job from the print service 160. Pull printing indicates a scheme in which the print service 160 transmits the information concerning the print job to the mediation service 190 in response to an inquiry (request) from the mediation service 190. Pull printing may be executed to process a plurality of print jobs at once.

The mediation processing unit 302 stores the information concerning the print job in the database. The information concerning the print job includes, for example, the print setting and print start time (the time instructed by the information processing apparatus 110 to execute printing) of the print job. The information concerning the print job is deleted from the database at the print end time or after a storage period elapses. The print data included in the print job is stored in a print data storage. The print data is deleted from the print data storage at the print end time or after a storage period elapses.

The access control unit 303 controls access to the print service. If, for example, processing executed by the mediation processing unit 302 requires access to the print service, it is determined whether access may be performed. To perform this determination processing, the access control unit 303 manages the status of past access to the print service (that is, performs access management). The access status may be managed by the time at which the mediation service 190 accessed the print service in the past.

Furthermore, the access control unit 303 manages a condition concerning access to the print service (that is, performs condition management). The condition concerning access will be referred to as the access condition hereinafter. More specifically, the access condition may be a condition concerning the number of times of access, and may be, for example, the condition that the number of times of access to the print service per unit time (for example, per sec) does not exceed an upper limit (for example, five).

Examples of tables stored in the database of the mediation service 190 will be described with reference to FIG. 4. The database of the mediation service 190 stores, for example, a printing apparatus information table 400, a print job information table 420, and an access information table 440. In addition to them, a table for managing the setting of the mediation service 190 may be stored.

The printing apparatus information table 400 stores information concerning a combination of an upstream logical printing apparatus and a downstream logical printing apparatus which are mediated by the mediation service 190. In the printing apparatus information table 400, a record is generated for each combination of an upstream logical printing apparatus and a downstream logical printing apparatus. The print service management unit 301 creates, in the printing apparatus information table 400, a record corresponding to an instruction from the user. The information stored in the printing apparatus information table 400 is referred to when the mediation service 190 mediates a print job.

Figure 4:
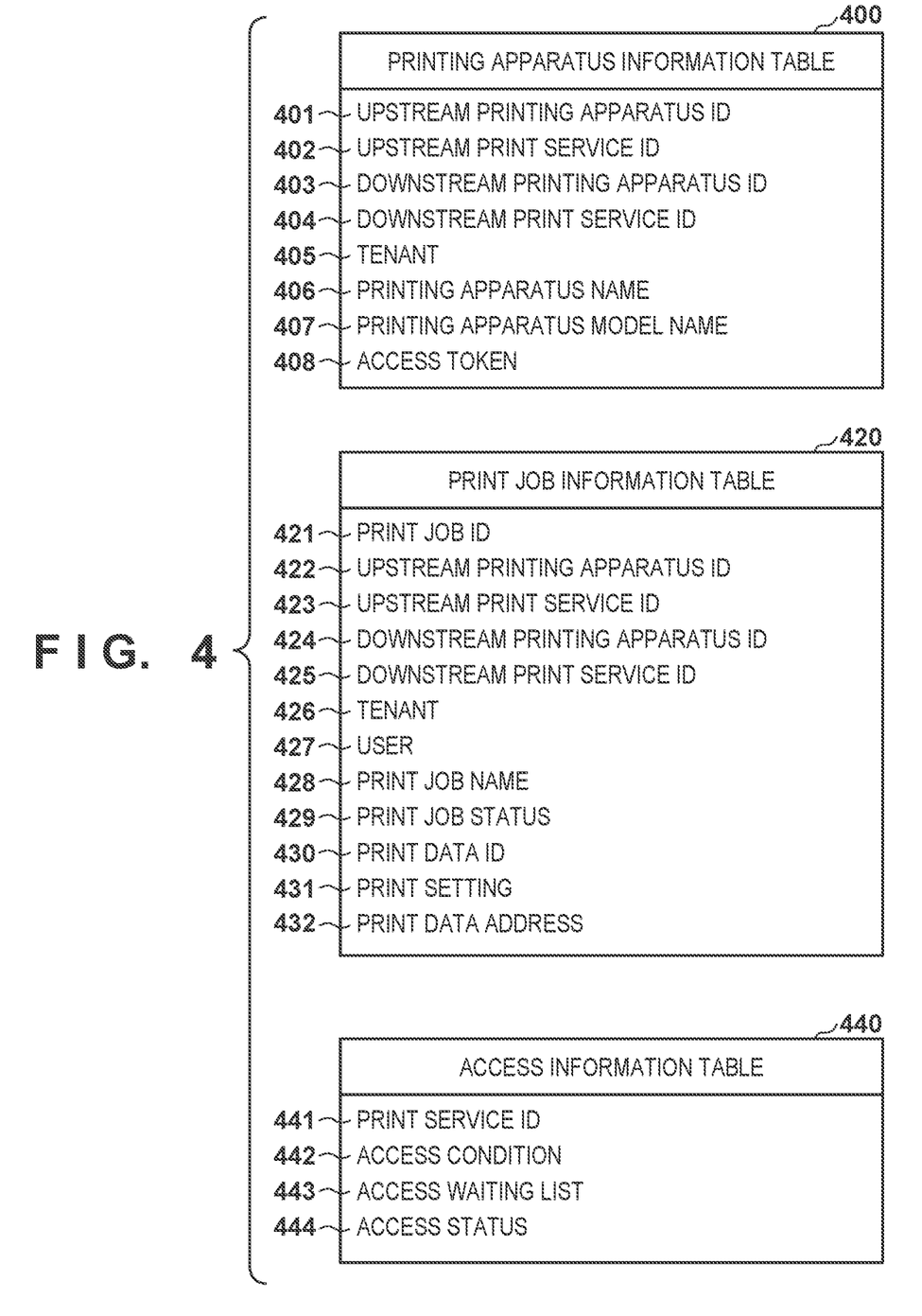
FIG. 4 is a view for explaining examples of tables according to the first embodiment.

Each record in the printing apparatus information table 400 includes a plurality of columns 401 to 408 shown in FIG. 4. The upstream printing apparatus ID 401 indicates the identification information of a logical printing apparatus provided by an upstream print service. The upstream print service ID 402 indicates the identification information of the upstream print service. The downstream printing apparatus ID 403 indicates the identification information of a logical printing apparatus provided by a downstream print service. The downstream print service ID 404 indicates the identification information of the downstream print service.

The tenant 405 indicates a company or group to which the user having a contract for the print service belongs. The printing apparatus name 406 indicates a display name arbitrarily set for the printing apparatus (for example, the printing apparatus 130) as the output destination. The printing apparatus model name 407 indicates the product name of the printing apparatus as the output destination. The access token 408 indicates a token used for authentication for accessing the upstream print service or the downstream print service.

The print job information table 420 stores information concerning a print job mediated by the mediation service 190. In the print job information table 420, a record is generated for each mediated print job. Every time the mediation processing unit 302 receives a print job from the upstream print service, it creates a record representing the print job in the print job information table 420. Upon the completion of printing by the print job, the mediation processing unit 302 deletes the corresponding record from the print job information table 420.

Each record in the print job information table 420 includes a plurality of columns 421 to 432 shown in FIG. 4. The print job ID 421 indicates the identification information of a print job. The columns 422 to 426 are the same as the columns 401 to 405, respectively, and a repetitive description thereof will be omitted. The user 427 indicates a user who executes printing. The print job name 428 indicates the name of the print job. The print job status 429 indicates the status of the print job. The print data ID 430 indicates identification information used by the upstream print service to manage print data. The print setting 431 indicates print settings for the print job. For example, the print setting 431 includes a print file name, a file format, a file size, a paper size, a paper type, a color setting, a print start time, and the location of the user who instructs printing. The print data address 432 indicates the address (for example, Uniform Resource Locator (URL)) of the print data in the print data storage used by the mediation service 190.

The access information table 440 stores information concerning access to a print service by the mediation service 190. In the access information table 440, a record is generated for each print service registered in the mediation service 190. If, in the example of the printing system in FIG. 1, the print services 160, 170, and 180 are registered in the mediation service 190, the access information table 440 includes a record for each of the print services 160, 170, and 180. Every time a print service is registered in the mediation service 190, the access control unit 303 generates a record in the access information table 440.

Each record in the access information table 440 includes a plurality of columns 441 to 444 shown in FIG. 4. The print service ID 441 indicates the identification information of a print service. The access condition 442 indicates a condition (the above-described access condition) concerning access to the print service. The access waiting list 443 indicates a list of processes that wait for access to the print service. The access waiting list 443 may be implemented by a queue. The access status 444 indicates the status of past access to the print service. For example, the access status 444 indicates the time at which the print service was accessed in the past.

The access condition 442 may be different for each print service. For example, the access condition for the print service 160 may be that the number of times of access per unit time (for example, per sec) is five or less. The access condition for the print service 180 may be that the number of times of access for a predetermined time (for example, for 1 sec) is 10 or less.

Figure 5:
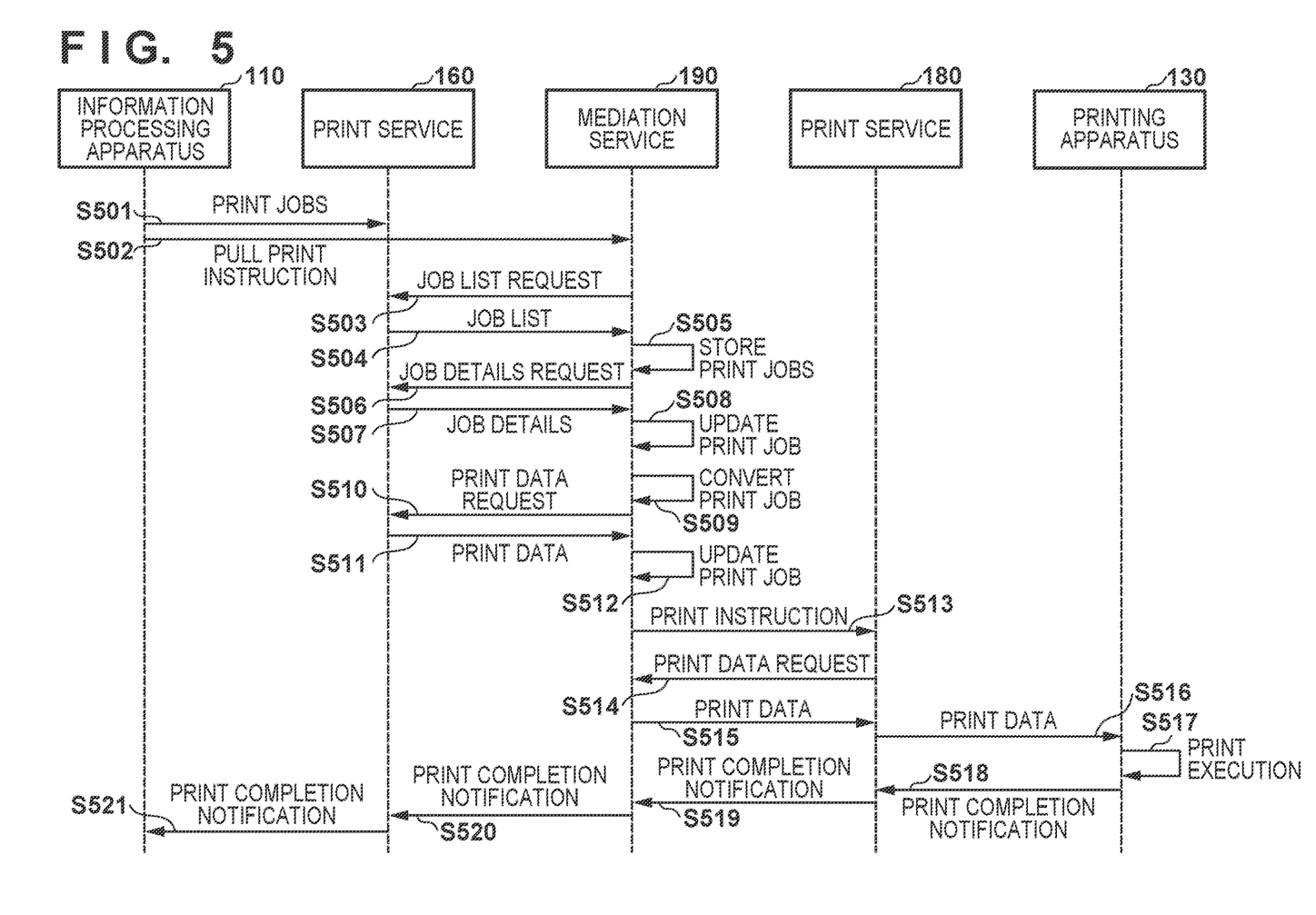
FIG. 5 is a sequence chart for explaining an example of the operation of the printing system according to the first embodiment.

An example of the operation of the printing system shown in FIG. 1 will be described with reference to FIG. 5. An example in which the information processing apparatus 110 designates the printing apparatus 130 and instructs it to execute printing, the print service 160 is an upstream print service, and the print service 180 is a downstream print service will be described with reference to FIG. 5. Furthermore, an example in which the information processing apparatus 110 instructs pull printing to the mediation service 190 will be described with reference to FIG. 5. The operation shown in FIG. 5 is started when the information processing apparatus 110 receives a print instruction from the user. At the start of the operation shown in FIG. 5, the information processing apparatus 110 can input a print job to the print service 160 (more specifically, the logical printing apparatus 161 thereof). Furthermore, at the start of the operation shown in FIG. 5, the print services 160 and 180 are associated with each other. The operation by the mediation service 190 in FIG. 5 is performed by the mediation processing unit 302. In the following description, transmission of a print job to the logical printing apparatus 161 of the print service 160 will simply be referred to as transmission of a print job to the print service 160 hereinafter.

In S501, the information processing apparatus 110 transmits a plurality of print jobs to the print service 160. In S502, the information processing apparatus 110 transmits, to the mediation service 190, an instruction of pull printing to the print service 160. In S503, the mediation service 190 requests a list of print jobs from the print service 160. In S504, the print service 160 transmits, to the mediation service 190, the list of print jobs held in the logical printing apparatus 161. Information of each print job in the list may be partial information of the print job, for example, only the print job ID 421 and the print data ID 430.

In S505, the mediation service 190 creates, in the print job information table 420, records corresponding to the print jobs in the received list. If the list includes information concerning a plurality of print jobs, the mediation service 190 may simultaneously execute succeeding processing for the plurality of print jobs.

In S506, the mediation service 190 requests details of the currently processed print job from the print service 160. In S507, the print service 160 transmits details of the print job to the mediation service 190 in response to the request. The details of the print job include information that has not been received in S504, such as the print job name 428, the print job status 429, and the print setting 431. In S508, the mediation service 190 updates the record corresponding to the currently processed print job in the print job information table 420 so as to include the received details of the print job.

In S509, the mediation service 190 converts the currently processed print job into a format that can be processed by the downstream print service (that is, the print service 180). In S510, the mediation service 190 requests print data concerning the currently processed print job from the print service 160. In S511, in response to this request, the print service 160 transmits the print data to the mediation service 190. As the data amount of the print data is larger, a longer time is required to receive the print data. If the reception of the print data ends, the mediation service 190 updates, in S512, the record corresponding to the currently processed print job in the print job information table 420 so as to include the address of the print data stored in the print data storage.

In S513, the mediation service 190 transmits a print instruction concerning the currently processed print job to the print service 180. This print instruction includes the print data address 432 and the detailed information of the print job converted in S509. In S514, in response to the print instruction, the print service 180 requests the print data from the mediation service 190. The print service 180 uses, as a destination address, the print data address 432 included in the print instruction. In S515, in response to this request, the mediation service 190 transmits the print data to the print service 180.

In S516, the print service 180 transmits the print data concerning the currently processed print job to the printing apparatus 130. The print data includes a print command. In S517, the printing apparatus 130 prints the received print data. In S518, upon the completion of printing, the printing apparatus 130 notifies the print service 180 of print completion. In S519, in response to the reception of the print completion notification, the print service 180 notifies the mediation service 190 of print completion. In S520, in response to the reception of the print completion notification, the mediation service 190 notifies the print service 160 of print completion. After this notification, the mediation service 190 deletes the record corresponding to the currently processed print job from the print job information table 420. In S521, in response to the reception of the print completion notification, the print service 160 notifies the information processing apparatus 110 of print completion.

Figure 6:
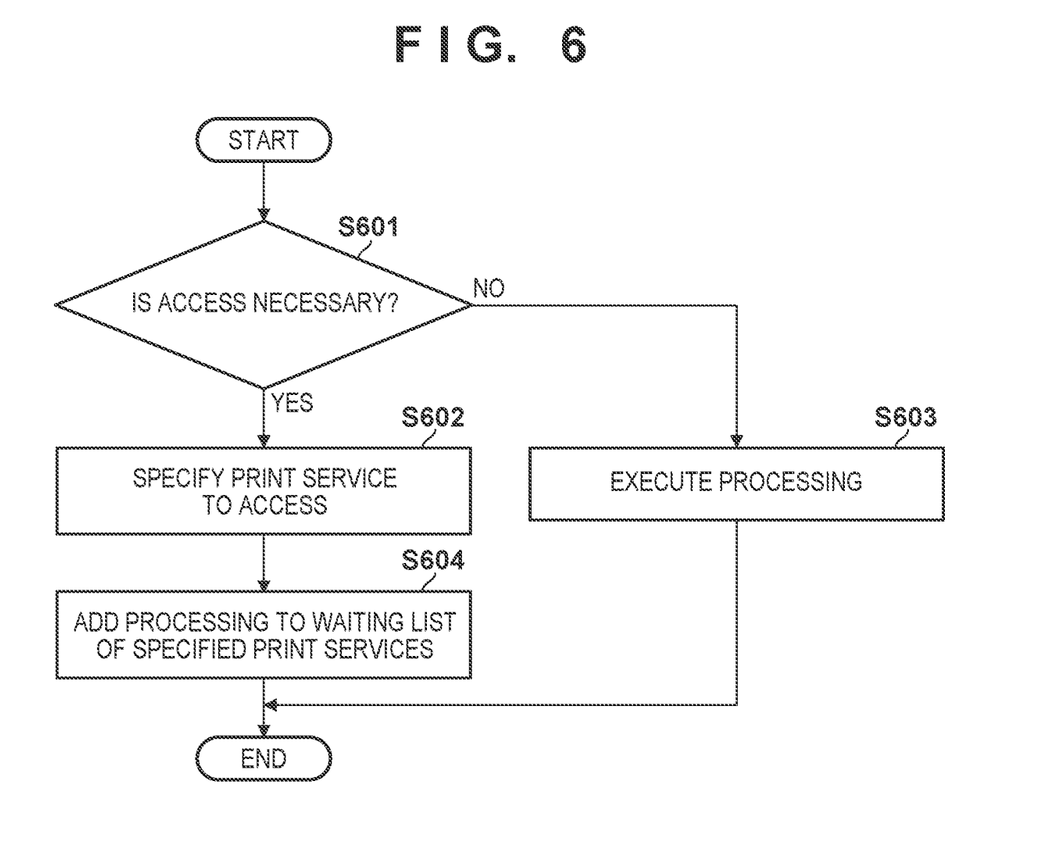
FIG. 6 is a flowchart for explaining an example of the operation of the mediation service according to the first embodiment.

An example of a control method executed by the computer 200 to provide the mediation service 190 will be described with reference to FIG. 6. This method is executed by the access control unit 303 of the mediation service 190. An operation by the access control unit 303 may be performed when the CPU 201 executes a program read out into a memory (for example, the RAM 203). The method shown in FIG. 6 is started every time the mediation service 190 attempts to execute processing. For example, the mediation service 190 may start the method shown in FIG. 6 every time the mediation service 190 attempts to execute processing in each of S503, S505, S506, S508, S509, S512, S513, S515, and S520 of FIG. 5.

In step S601, the mediation service 190 determines whether processing to be executed requires access to the print service. If it is determined that access to the print service is required ("YES" in step S601), the mediation service 190 advances the process to step S602; otherwise ("NO" in step S601), the mediation service 190 advances the process to step S603. For example, in the example shown in FIG. 5, the processing in each of S503, S506, S513, S515, and S520 requires access to the print service, and the processing in each of S505, S508, S509, and S512 requires no access to the print service.

If it is determined that no access to the print service is required, the mediation service 190 executes, in step S603, the processing to be executed. In this processing, no access to the print service is made. If it is determined that access to the print service is required, the mediation service 190 specifies, in step S602, the print service to be accessed. For example, in the example shown in FIG. 5, it is specified for the processing in each of S503, S506, and S520 that the print service 160 is to be accessed, and it is specified for the processing in each of S513 and S515 that the print service 180 is to be accessed.

In step S604, the mediation service 190 adds the processing to be executed to the end of the access waiting list 443 in the record corresponding to the specified print service in the access information table 440.

Figure 7:
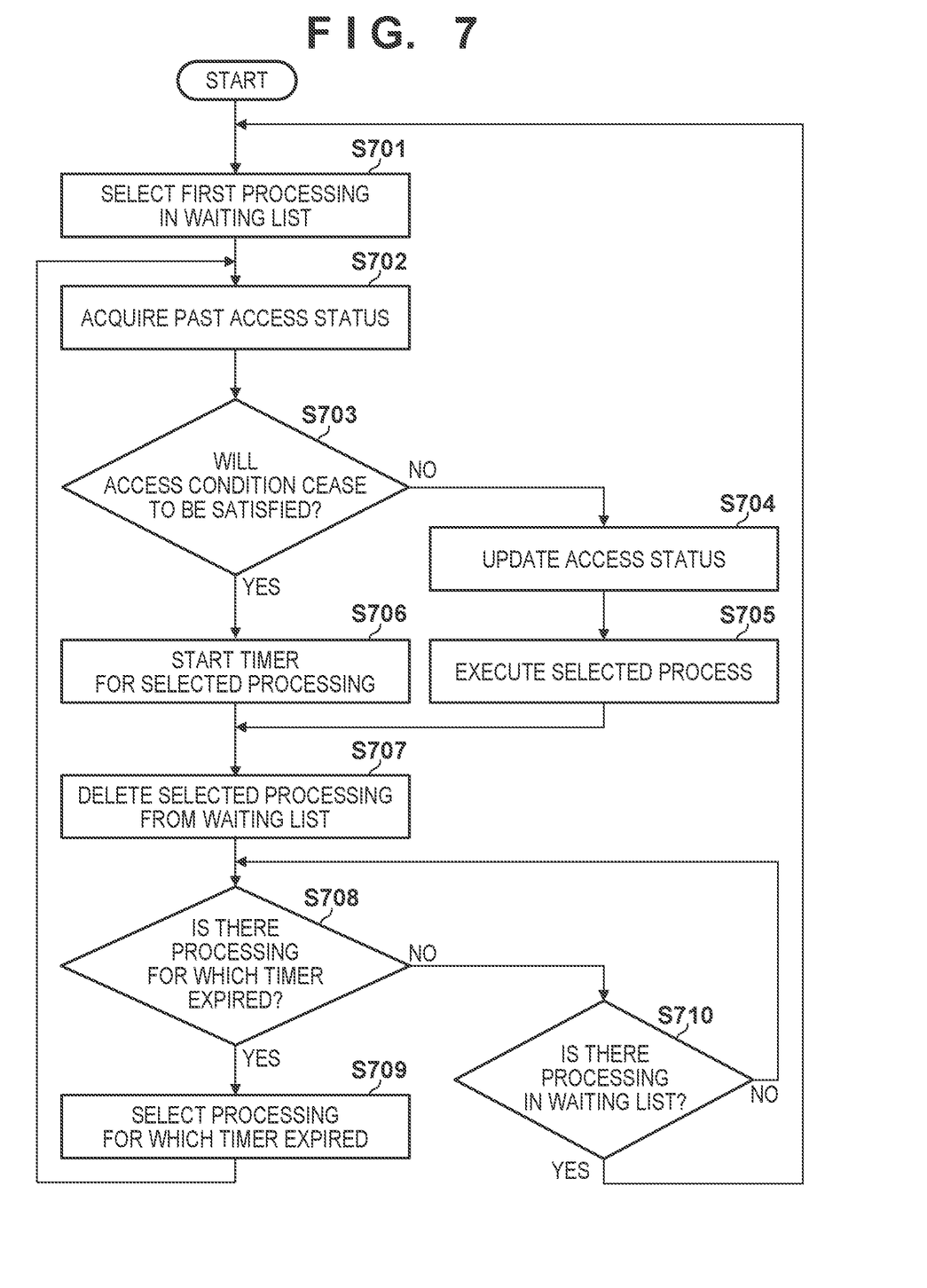
FIG. 7 is a flowchart for explaining an example of the operation of the mediation service according to the first embodiment.

An example of a control method executed by the computer 200 to provide the mediation service 190 will be described with reference to FIG. 7. This method is executed by the access control unit 303 of the mediation service 190. An operation by the access control unit 303 may be performed when the CPU 201 executes a program read out into a memory (for example, the RAM 203). The method shown in FIG. 7 is started when the access waiting list 443 is not empty. The mediation service 190 may simultaneously execute the method of FIG. 7 for the respective records in the access information table 440. In other words, the mediation service 190 may simultaneously execute the method of FIG. 7 for the respective print services. In the example shown in FIG. 5, the mediation service 190 executes the method of FIG. 7 for the print services 160 and 180.

In step S701, the mediation service 190 selects the first processing in the access waiting list 443. In step S702, the mediation service 190 acquires the status of past access to the print service based on the access status 444.

In step S703, the mediation service 190 determines, based on the status of past access, whether the access condition is not to be satisfied by newly accessing the print service. As described above, the access condition for the print service is managed by the access condition 442. If it is determined that the access condition is not to be satisfied ("YES" in step S703), the mediation service 190 advances the process to step S706; otherwise ("NO" in step S703), the mediation service 190 advances the process to step S704.

If the access condition defines the upper limit of the number of times of access per unit time, when the number of times of access during a period of the unit time before the current time reaches the upper limit, it is determined that the access condition is not to be satisfied by new access. On the other hand, in this example, if the number of times of access during the period of the unit time before the current time does not reach the upper limit, it is determined that the access condition is satisfied even after new access is made.

If it is determined that the access condition is still to be satisfied, the mediation service 190 updates the access status 444 in step S704. More specifically, the mediation service 190 records, in the access status 444, the time (current time) at which step S704 is executed. After that, in step S705, the mediation service 190 executes the currently selected processing by accessing the print service. For example, if the currently selected processing is the processing in S503 of FIG. 5, the mediation service 190 requests a job list from the print service 160. In this way, every time the print service is accessed, the time is recorded in the access status 444.

If it is determined that the access condition is not to be satisfied, the mediation service 190 starts, in step S706, a timer to wait for execution of the currently selected processing. At this time, the print service is not newly accessed. The value of the timer defines the wait time during which execution of the currently selected processing is awaited. In some embodiments, the value of the timer may be the same value (for example, 100 msec) regardless of the currently selected processing. The value of the timer may be determined in advance, and stored in, for example, the ROM 202.

In step S707, the mediation service 190 deletes the currently selected processing from the access waiting list 443 regardless of the determination result in step S703. If NO is determined in step S703, the currently selected processing is executed in step S705. Therefore, this processing need not be kept in the access waiting list 443. On the other hand, with respect to the processing that is not executed when YES is determined in step S703, a retry timing is controlled by not the access waiting list 443 but the timer, as will be described later.

In step S708, the mediation service 190 determines whether there is processing for which the timer is expired. If it is determined that there is processing for which the timer is expired ("YES" in step S708), the mediation service 190 advances the process to step S709; otherwise ("NO" in step S708), the mediation service 190 advances the process to step S710.

In step S709, the mediation service 190 selects the processing for which the timer is expired, and repeats the processes in step S702 and the subsequent steps. Thus, the processing for which the timer is expired is the currently selected processing. The mediation service 190 retries to access the print service with respect to the individual processing.

In step S710, the mediation service 190 determines whether the access waiting list 443 includes processing. If it is determined that the access waiting list 443 includes processing ("YES" in step S710), the mediation service 190 advances the process to step S701; otherwise ("NO" in step S710), the mediation service 190 advances the process to step S708. If it is determined that the access waiting list 443 includes processing, the first processing in the access waiting list 443 is selected, and the processes in step S701 and the subsequent steps are repeated. If it is determined that the access waiting list 443 includes no processing, it is determined whether there is processing for which the timer is expired.

According to the above-described method, if the access condition is not to be satisfied by newly accessing the print service, the mediation service 190 does not access the print service. Therefore, it is possible to suppress the load from being concentrated on the print service, and suppress access from the mediation service 190 to the print service from being interrupted by the firewall of the print service.

According to the above-described method, after the currently selected processing is deleted from the access waiting list 443 in step S707, the processing for which the timer is expired is selected before the first processing in the access waiting list 443. Therefore, even if the access waiting list 443 is not empty, access is retried with respect to the individual processing.

In the above-described method, if the timer is expired, access is retried with respect to the individual processing. Instead of this, if it is determined in step S703 that the access condition is not to be satisfied by newly accessing the print service, the currently selected processing may be returned to the end of the access waiting list 443. In this method, steps S708 and S709 associated with the timer are skipped.

In the above-described embodiment, an upstream print service and a downstream print service are mediated by the mediation service 190. Instead of this, a print job may be transmitted directly from an upstream print service to a downstream print service (that is, without intervention of the mediation service 190). In this case, the upstream print service may perform the above-described operations of FIGS. 6 and 7 to access the downstream print service. Furthermore, the downstream print service may perform the above-described operations of FIGS. 6 and 7 to access the upstream print service.

The mediation service 190 may receive a print job from each of a plurality of upstream print services (for example, the print services 160 and 170), and transmit print data corresponding to the print job to one downstream print service (for example, the print service 180). In this case, the mediation service 190 may manage, for each of the plurality of upstream print services, the status of past access to each individual print service and a condition concerning access to each individual print service. In this case, the mediation service 190 may perform the above-described operations of FIGS. 6 and 7 for each of the plurality of upstream print services.

Second Embodiment

Figure 8:
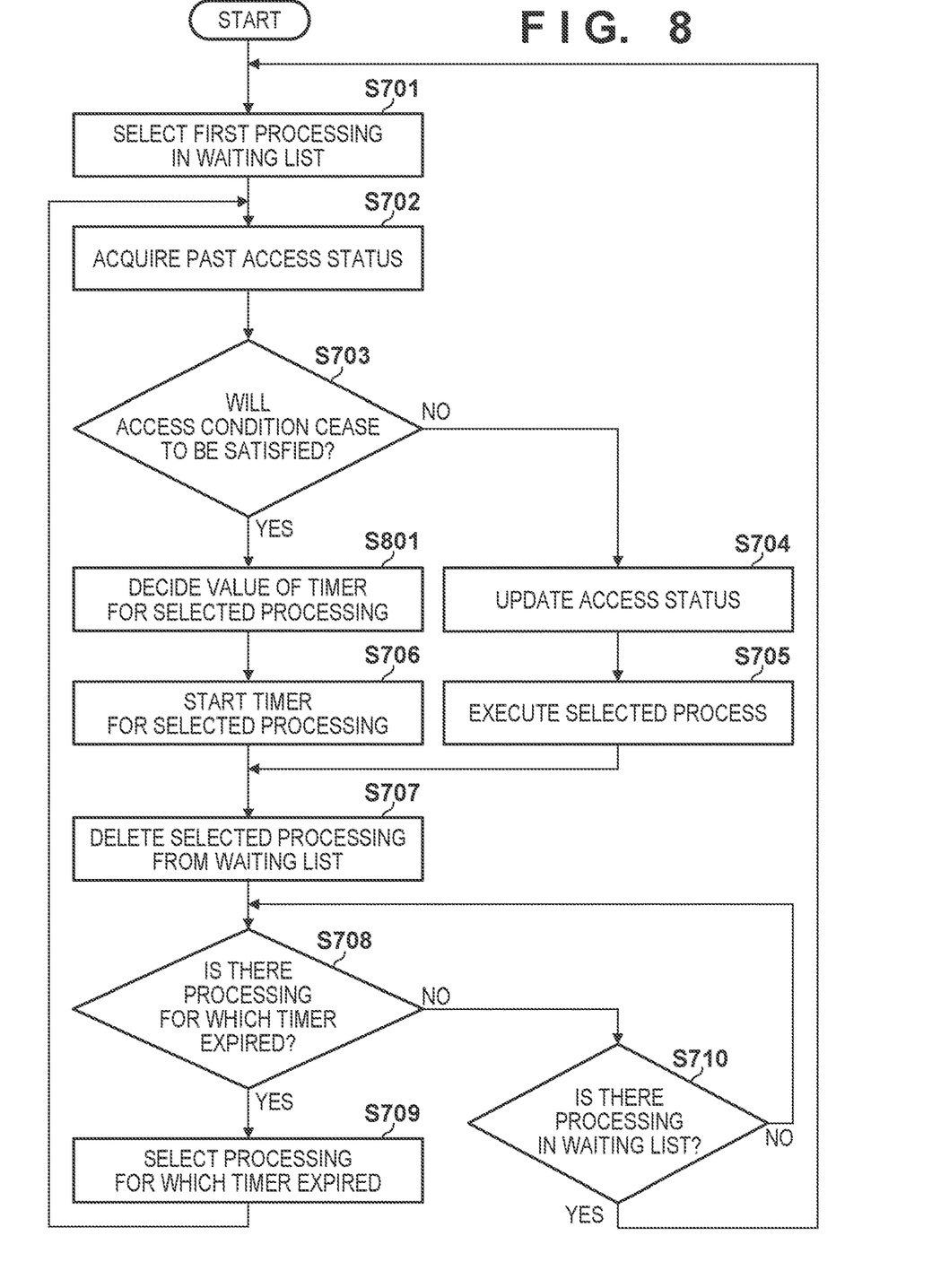
FIG. 8 is a flowchart for explaining an example of the operation of a mediation service according to a second embodiment.

A second embodiment will be described with reference to FIG. 8. The difference from the first embodiment will mainly be explained below and a repetitive description of points that may be the same as in the first embodiment will be omitted.

In the first embodiment, in step S706 of FIG. 7, the same value is set as the wait time regardless of the currently selected processing. In the second embodiment, based on the priority level of currently selected processing, a wait time (that is, the value of a timer) for the currently selected processing is decided. More specifically, a mediation service 190 may evaluate the priority level of each individual process in three levels (for example, high/middle/low), and set a shorter wait time for processing having a higher priority level. For example, the mediation service 190 may set a shortest wait time of 100 msec for processing having a high priority level. The mediation service 190 may set a second shortest wait time of 200 msec for processing having a middle priority level. The mediation service 190 may set a longest wait time of 500 msec for processing having a low priority level. In this example, each individual process has three priority levels. However, two or four or more priority levels may be used. In this way, by deciding the wait time based on the priority level of the processing, access is retried more often for processing having a higher priority level, and thus the probability that the processing having the higher priority level is executed first is high.

An example of a control method executed by a computer 200 to provide the mediation service 190 according to the second embodiment will be described with reference to FIG. 8. This method is executed by an access control unit 303 of the mediation service 190. An operation by the access control unit 303 may be performed when a CPU 201 executes a program read out into a memory (for example, a RAM 203). The method of FIG. 8 is different from the method of FIG. 7 in that if YES is determined in step S703, step S801 is executed before execution of step S706 and the remaining points may be the same. Therefore, FIG. 8 does not illustrate some of the blocks of the same operations as those in FIG. 7.

In step S801, the mediation service 190 decides the value of the timer for the currently selected processing. In the example shown in FIG. 8, after it is determined that an access condition is not to be satisfied by accessing a print service to perform the currently selected processing, the wait time for the currently selected processing is decided. By deciding the wait time at the time of confirming the use of the wait time, it is possible to avoid the decided wait time from not being used.

A practical method of deciding the priority level of each individual process will be described below. In S510 of FIG. 5, the time taken to receive print data requested of a print service 160 by the mediation service 190 can vary due to various factors. To cope with this, the mediation service 190 may expect the time taken to receive print data and decide the priority level of the individual process based on the expected time. That is, with respect to processing of receiving print data from the print service 160, the mediation service 190 decides the wait time for the processing based on the expected time taken to receive the print data. The mediation service 190 may set a higher priority level for processing concerning a print job for which the expected time taken to receive the print data is longer.

The mediation service 190 may expect the time taken for reception based on a print setting 431 (for example, a file format, a file size, and the location of the user included therein) in a print job information table 420. As an amount of print data like the file format and the file size is larger, the time taken for reception is longer. If a print service 160 is provided by a cloud, a server close to the location of the user provides the print service 160. Therefore, if the location of the user is far from the location of a server that provides the mediation service 190, the location of the server that provides the mediation service 190 tends to be far from the server that provides the print service 160. If the distance between the servers is longer, the time taken for reception tends to be longer.

Assume that processes (processes of requesting print data) in S510 of FIG. 5 with respect to the plurality of print jobs are included in an access waiting list 443 and cannot be executed. In this case, the wait time is shorter for the print job for which the expected time taken to receive the print data is longer, and thus the print job is highly probably executed first. Therefore, it is possible to suppress variations in print completion time with respect to the plurality of print jobs, thereby improving the operability of the user.

Subsequently, another practical method of deciding the priority level of each individual process will be described. The mediation service 190 may decide the priority level of each individual process based on the type of the individual process. Access to the print service 160 will be examined below. For example, processes in S506 and S510 of FIG. 5 are executed in relation to the print job before execution of printing. Therefore, if the processes are delayed, the print completion time is also delayed. On the other hand, processing in S520 of FIG. 5 is performed in relation to the print job after execution of printing. Therefore, even if this processing is delayed, this does not influence the print completion time. Thus, the mediation service 190 may set a high priority level for the processing performed in relation to the print job before execution of printing, and set the short wait time for this processing, as compared with the delay time of the processing performed in relation to the print job before execution of printing.

The mediation service 190 may execute processing of accessing the print service 160 (for example, processing related to registration of the print service 160) without relation to the print job. Since this processing does not influence the print time, the mediation service 190 may set, for such processing, a priority level lower than that of the processing performed in relation to the print job before execution of printing. Therefore, the mediation service 190 may set the short wait time for the processing performed in relation to the print job before execution of printing, as compared with the wait time for the processing without relation to the print job.

As described above, by setting the short wait time for the processing performed in relation to the print job before execution of printing, this processing is retried early, thereby shortening the time until execution of printing.

In the above-described embodiment, since the wait time of the processing having the low priority level is longer than the wait time of another processing, access may not be made many times with respect to the processing having the low priority level. To cope with this, if access for performing the individual process is not made for a threshold time (for example, 5 sec) or the threshold number of times (for example, 10 times), the mediation service 190 may shorten the wait time for the individual process. For example, the mediation service 190 may raise the priority level of the processing from the low level to the middle level, or raise the priority level of the processing from the middle level to the high level. This makes it easy to execute processing for which access has not been made successively.

In the above-described method, after it is determined that the access condition is not to be satisfied by accessing the print service to perform the currently selected processing, the wait time for the currently selected processing is decided. Instead of this, mediation service 190 may decide the wait time for the individual process at another timing. For example, the mediation service 190 may decide, at the time of adding processing to the access waiting list 443, the wait time for the processing, and store it in the memory. Instead of this, if the print service returns from a service down state or a maintenance state, the mediation service 190 may decide the wait time for each process in the access waiting list 443. Furthermore, the mediation service 190 may decide the wait time for each process in the access waiting list 443 at a regular interval.

Third Embodiment

Figure 9:
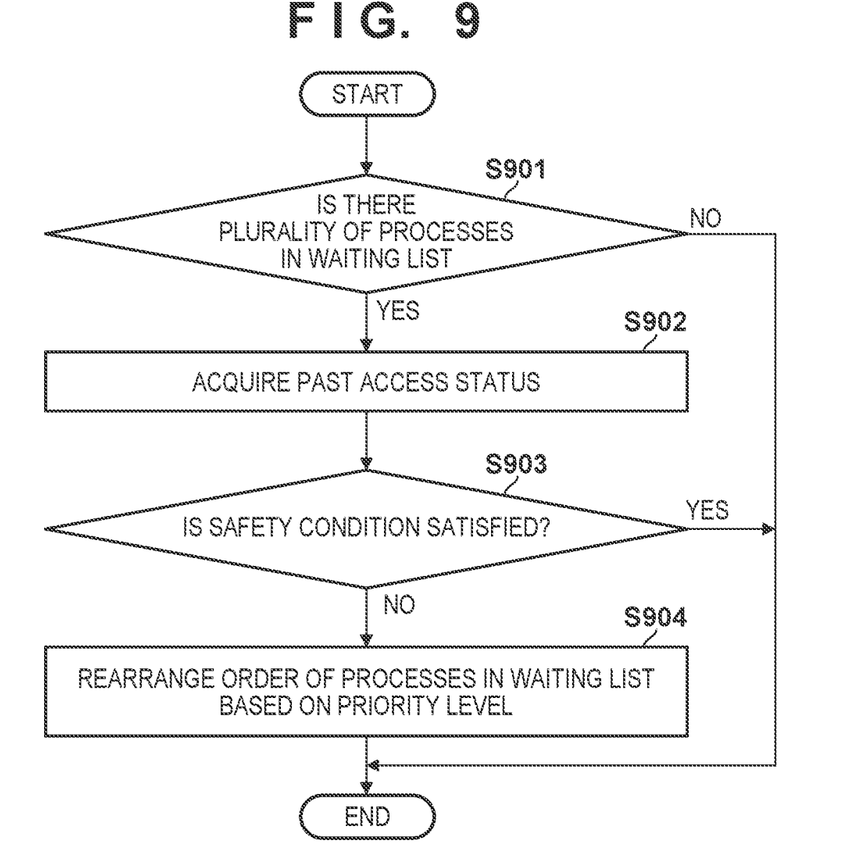
FIG. 9 is a flowchart for explaining an example of the operation of a mediation service according to a third embodiment.

A third embodiment will be described with reference to FIG. 9. In the third embodiment, a mediation service 190 executes an operation shown in FIG. 9 in addition to the first or second embodiment. The method of FIG. 9 is executed by an access control unit 303 of the mediation service 190. An operation by the access control unit 303 may be performed when a CPU 201 executes a program read out into a memory (for example, a RAM 203). The mediation service 190 may start the operation shown in FIG. 9 at a regular interval.

In step S901, the mediation service 190 determines whether an access waiting list 443 includes a plurality of processes waiting for access. If it is determined that a plurality of processes are included ("YES" in step S901), the mediation service 190 advances the process to step S902; otherwise ("NO" in step S901), the mediation service 190 ends the processing.

In step S902, the mediation service 190 acquires the status of past access. In step S903, the mediation service 190 determines based on the status of past access whether a safety condition concerning access to a print service is satisfied. If it is determined that the safety condition is not satisfied ("NO" in step S903), the mediation service 190 advances the process to step S904; otherwise ("YES" in step S903), the mediation service 190 ends the processing.

The safety condition is a condition for determining a state in which the probability that the above-described access condition is not to be satisfied is low. For example, the safety condition may be a condition that is the necessary condition of the above-described access condition but is not the sufficient condition. In this case, if the safety condition is satisfied, the access condition is satisfied.

For example, assume that the access condition is that the number of times of access to the print service per unit time (for example, per sec) does not exceed an upper limit (for example, five). In this case, the safety condition may be that the number of times of access to the print service per unit time (for example, per sec) does not exceed an upper limit (for example, three) lower than the above upper limit. The upper limit of the safety condition may be defined by a ratio (for example, 80%) to the upper limit of the access condition or by a difference from the upper limit of the access condition (for example, a value obtained by subtracting 2 from the upper limit). The safety condition may be different for each print service.

If the safety condition is not satisfied, there is the possibility of not satisfying the access condition soon. To cope with this, in step S904, the mediation service 190 rearranges the order of the plurality of processes in the access waiting list 443 based on the priority levels of the individual processes in the access waiting list 443. A method of deciding the priority level of each individual process may be the same as in the second embodiment. For example, the mediation service 190 rearranges the processes so that the processing having a higher priority level is closer to the top of the access waiting list 443. The mediation service 190 may maintain the original order with respect to the processes having the same priority level. By rearranging the processes in this way, the processing having a higher priority level is selected first in step S701 of FIG. 7. Therefore, the print service is accessed first with respect to the processing having a higher priority level among the plurality of processes.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-028380, filed Feb. 25, 2022, which is hereby incorporated by reference herein in its entirety.

What is claimed is:

1. A server for receiving a print job from a print service that has received the print job from an information processing apparatus, the server comprising at least one processor circuit and a memory storing instructions, with the processor circuit executing the instructions to:
    access the print service;
    manage a condition concerning access to the print service;
    manage a status of past access to the print service; and
    determine, based on the status of past access, whether the condition is not to be satisfied by newly accessing the print service,
    wherein the processor circuit further executes the instructions to:
    in a case where it is determined the condition is not to be satisfied, cease to newly access the print service, and
    in a case where the print service is not accessed since the condition is not to be satisfied, after a wait time for an individual processing elapses, retry to access the print service with respect to the individual processing.

2. The server according to claim 1, wherein the instructions are further executed to decide a length of the wait time based on a priority level of the individual processing.

3. The server according to claim 1, wherein the instructions are further executed to, in a case where the individual processing is to receive print data from the print service, decide the wait time based on an expected time taken to receive the print data.

4. The server according to claim 1, wherein the instructions are further executed to set the wait time for processing performed in relation to the print job before execution of printing to be shorter than the wait time for processing performed in relation to the print job after execution of printing.

5. The server according to claim 1, wherein the instructions are further executed to set the wait time for processing performed in relation to the print job before execution of printing to be shorter than the wait time for processing without relation to the print job.

6. The server according to claim 1, wherein the instructions are further executed to, after it is determined that the condition is not to be satisfied by accessing the print service to perform the individual processing, decide the wait time for the individual processing.

7. The server according to claim 1, wherein the instructions are further executed to, in a case where access for performing an individual processing is not made for a threshold time or a threshold number of times, shorten the wait time for the individual processing.

8. The server according to claim 1, wherein
the server receives a print job from each of a plurality of print services including the print service, and the instructions are further executed to:
manage, for each of the plurality of print services, a status of past access to an individual print service, and
manage, for each of the plurality of print services, a condition concerning access to an individual print service.

9. The server according to claim 1, wherein the instructions are further executed to, in a case where there exist a plurality of processes waiting for access to the print service and a second condition concerning access to the print service is not satisfied, access the print service first for processing having a higher priority level among the plurality of processes.

10. The server according to claim 1, wherein the condition includes a condition that the number of times of access to the print service per unit time does not exceed an upper limit.

11. A non-transitory storage medium storing a program comprising instructions, that when executed by at least one processor circuit, cause the processor circuit to:
access a print service;
manage a condition concerning access to the print service;
manage a status of past access to the print service; and
determine, based on the status of past access, whether the condition is not to be satisfied by newly accessing the print service,
wherein the instructions are further executed to:
in a case where it is determined the condition is not to be satisfied, cease to newly access the print service, and
in a case where the print service is not accessed since the condition is not to be satisfied, after a wait time for an individual processing elapses, retry to access the print service with respect to the individual processing.

12. A method of controlling a server for receiving a print job from a print service that has received the print job from an information processing apparatus, the method comprising:
accessing the print service;
managing a condition concerning access to the print service;
managing a status of past access to the print service; and
determining, based on the status of past access, whether the condition is not to be satisfied by newly accessing the print service,
wherein in a case where it is determined the condition is not to be satisfied, the print service is not newly accessed in the accessing the print service, and
in a case where the print service is not accessed since the condition is not to be satisfied, after a wait time for an individual processing elapses, the print service is retried to access with respect to the individual processing.

* * * * *